United States Patent
Bond et al.

(10) Patent No.: US 10,916,233 B2
(45) Date of Patent: Feb. 9, 2021

(54) UNDERWATER FLEXTENSIONAL TRANSDUCER

(71) Applicant: THALES HOLDINGS UK PLC, Berkshire (GB)

(72) Inventors: Andrew Bond, Somerset (GB); Alan Elliott, Somerset (GB)

(73) Assignee: THALES HOLDINGS UK PLC, Berkshire (GB)

( * ) Notice: Subject to any disclaimer, the term of this patent is extended or adjusted under 35 U.S.C. 154(b) by 339 days.

(21) Appl. No.: 16/030,314

(22) Filed: Jul. 9, 2018

(65) Prior Publication Data
US 2019/0013001 A1 Jan. 10, 2019

(30) Foreign Application Priority Data

Jul. 7, 2017 (GB) .................................. 1710958.8

(51) Int. Cl.
*H04R 17/00* (2006.01)
*H04R 15/00* (2006.01)
(Continued)

(52) U.S. Cl.
CPC .............. *G10K 9/121* (2013.01); *G01S 7/521* (2013.01); *H04R 7/14* (2013.01); *H04R 31/00* (2013.01);
(Continued)

(58) Field of Classification Search
CPC .... G10K 9/121; G10K 2200/11; G01S 7/521; H04R 31/003; H04R 7/14; H04R 31/00;
(Continued)

(56) References Cited

U.S. PATENT DOCUMENTS 3,277,433 A 10/1966 Toulis
4,922,470 A 5/1990 McMahon et al.
(Continued)

FOREIGN PATENT DOCUMENTS

AU 2018204861 A1 * 1/2019 ............. H04R 31/00
EP 3425627 A1 * 1/2019 ............... H04R 7/14
(Continued)

OTHER PUBLICATIONS

Xue et al., Lijue, "Laser Powder Deposition for Making Functional Net-Shape Parts and Repairing Damaged Gas Turbine Components," Materials Science and Technology 2007 Conference Proceedings, Sep. 16-20, 2007, Detroit, Michigan, pp. 315-328.
(Continued)

*Primary Examiner* — Daniel Pihulic
(74) *Attorney, Agent, or Firm* — Hauptman Ham, LLP (57) ABSTRACT

In accordance with embodiments of the present disclosure, a flextensional transducer for underwater operation includes a driving element and a stave. The stave is made from a material with elastic properties and has a porous structure. The porous structure is adapted to be modelled such that when in use, said porous structure of the stave is of an arbitrary alignment with respect to, for instance, the driving element, and has a degree of porosity. The degree of porosity is such that the elastic properties and vibrational frequency response of the stave can be customised with respect to its intended use.

13 Claims, 9 Drawing Sheets

(51) Int. Cl.
*H04R 31/00* (2006.01)
*G10K 9/12* (2006.01)
*G01S 7/521* (2006.01)
*H04R 7/14* (2006.01)
*H04R 1/44* (2006.01)
*H04R 17/02* (2006.01)

(52) U.S. Cl.
CPC ....... *H04R 31/003* (2013.01); *G10K 2200/11* (2013.01); *H04R 1/44* (2013.01); *H04R 15/00* (2013.01); *H04R 17/00* (2013.01); *H04R 17/02* (2013.01)

(58) Field of Classification Search
CPC .......... H04R 1/44; H04R 17/02; H04R 15/00; H04R 17/00
See application file for complete search history.

(56) References Cited

U.S. PATENT DOCUMENTS 6,956,792 B1  10/2005  Osborn et al.
7,336,022 B2 *  2/2008  Schuh ................. H01L 41/0926
                                                    310/317
2011/0266085 A1 *  11/2011  Laine .................... G01V 1/145
                                                    181/113
2019/0013001 A1 *  1/2019  Bond ................... H04R 31/003

FOREIGN PATENT DOCUMENTS

GB       201710958      *  8/2017    ............. G01S 7/521
GB       2564421 A      *  1/2019    ............... H04R 7/14
WO       03061334 A2       7/2003
WO       2010076391 A1     7/2010

OTHER PUBLICATIONS

Kovacik, J., "Correlation between Young's modulus and porosity in porous materials," Journal of Materials Science Letters, 18, 1999, Bratislava, Slovak Republic, pp. 1007-1010.

United Kingdom Search Report issued in corresponding Application No. GB1710958.8, dated Dec. 14, 2017, Intellectual Property Office, South Wales, Great Britain.

European Search Report issued in corresponding Application No. 18179691.3, dated Dec. 6, 2018, European Patent Office, Munich, Germany.

* cited by examiner

UNDERWATER FLEXTENSIONAL TRANSDUCER

FIELD OF THE INVENTION

The embodiments described herein relate to flextensional transducer devices for underwater use. In particular, the present application describes an approach which increases the freedom, and reduces the limitations, to their design, thereby allowing for devices which are smaller and lighter than existing devices to be developed, while retaining the necessary high performance and resonant frequency response.

BACKGROUND OF THE INVENTION

Flextensional transducer devices represent a useful class of instruments for a variety of underwater operations, such as sonar, seismic monitoring, and communications. Such devices operate partly by causing a flexing component of the device to flex, or vibrate. This flexing component of the flextensional transducer device is usually coupled to a separate driving element of the device and is typically referred to as a stave.

The stave can be fabricated to be a variety of different shapes, including ovals, barrels, inverted barrels, spheres, and dual shells. This gives rise to a number of different classes of stave design, each with different characteristics in terms of the frequency range of sensitivity, or bandwidth, and the directional sensitivity of the device.

For certain uses, it is favourable for the flextensional transducer to operate at a high power and a low frequency of resonance, such as for taking seismic measurements or for active or passive sonar. In this case the stave of the device must be carefully designed to be highly resonant at the desired frequency in order to meet the high power requirement when in use underwater.

Consequently, in order to carry out this careful design of the stave in order to meet the operation requirements of the overall device, a range of parameters must be considered. These include the shape and size of the device, the method used to drive the vibrational behaviour of the stave, the material which the stave is constructed from, and the intrinsic elastic behaviour of that material. Each of these parameters will be considered and discussed in detail later in this description.

Conventional modern flextensional transducers, while exhibiting high levels of performance and adaptability for different uses, are subject to limitations in their size and mass. In order to ensure the flextensional device performs as required, the materials used and the size of the staves must be chosen appropriately. This often leads to larger and heavier devices, and any reduction in size or mass results in a reduction of operational performance.

The inventors have recognised that having greater freedom in the design of flextensional transducer devices, while preserving the high performance of such devices, would be valuable for meeting current operational needs. For instance, the ability to manufacture high performance flextensional transducers of a reduced size and mass would be beneficial, and would deliver several notable advantages over larger, heavier devices. This includes but is not limited to a greater ease in the transportation of such devices, and an improved ease of use given the reduced weight. The greater adaptability to different applications and broader choice in the materials and dimensions available in the designing of these devices would be a significant advantage, and it can therefore be appreciated that there is a need in the field for developing this capability.

There have been flextensional transducer devices demonstrated which employ staves that contain a structure in an attempt to maintain the appropriate stiffness in a set direction. Consequently, they must be carefully designed and must have very specific geometries. This geometric limitation can alternatively be described as having a high degree of directionality, in that they must be aligned very specifically with respect to the rest of the device in order to have the necessary resonant frequency response as the adjacent layers. For instance, such a structure may have to be aligned with respect to the driving element or the long axis of the device.

SUMMARY OF THE INVENTION

The invention described herein relates to a new approach to designing flextensional transducer devices, where the stave of the device comprises a porous structure that can be customised. The degree of porosity allows for the resonant behaviour of the flextensional transducer device to be tailored and adapted for a wide variety of different requirements, enabling such devices to be designed with a greater degree of freedom with respect to their size and mass. For example, a flextensional transducer device which comprises such a porous stave structure can be made significantly smaller and lighter than any equivalent conventional device currently available, while maintaining a high level of performance with respect to the frequency response of the device. Additionally, the material used to construct the stave of such a device can be chosen from any of a wide range of different materials, since the degree of porosity of the stave structure can be chosen to ensure that the flextensional transducer incorporating the stave achieves the desired performance for the intended application.

According to a first aspect of the invention, there is provided a flextensional transducer for underwater operation according to claim 1. The transducer comprises a driving element and a stave, wherein the stave is made from a material with elastic properties and has a porous structure. The porous structure is adapted to be modelled such that when in use, said porous structure of the stave is of an arbitrary alignment with respect to the driving element and has a degree of porosity, such that the elastic properties and vibrational frequency response of the stave can be customised with respect to its intended use.

Preferably, the porous structure is a lattice, wherein the elastic properties and vibrational frequency response of the stave are additionally customised by the choice of geometry of the unit cells of a lattice of the porous structure.

Preferably, the porous structure can also be adapted to alter the overall effective density of the stave.

Preferably, the stave is a single part.

Preferably, the stave is comprised of a plurality of segments.

Preferably, the driving element comprises at least one piezoelectric element or a magnetostrictive element.

Preferably, the stave is manufactured by additive manufacturing.

Preferably, the stave is manufactured from a metal, a metal alloy, or a plastic.

Preferably, the stave is a barrel-stave flextensional transducer type.

Preferably, the porous structure of the stave comprises a periodic lattice.

Preferably, the porous structure of the stave comprises an ordered but non-periodic lattice.

Preferably, the porous structure of the stave comprises a foam.

Preferably, the flextensional transducer is sealed inside a rubber sleeve.

Preferably, the flextensional transducer is sealed using a sealant which surrounds the stave.

According to another aspect of the invention, there is provided a method for manufacturing a flextensional transducer for underwater operation, where the flextensional transducer comprises a driving element and a stave. The stave is made from a material with elastic properties, has a porous structure, and is of an arbitrary alignment with respect to the driving element. The method comprises identifying a desired resonant frequency, identifying a desired size of the stave, identifying a degree of porosity for the porous structure required to ensure the stave has the desired elastic properties and vibrational frequency response for the chosen size of the stave, and constructing the stave to the desired size and having the degree of porosity required in order to possess the desired resonant frequency.

Preferably, the method additionally comprises identifying a lattice unit cell type required to further ensure the stave has the desired elastic properties and vibrational frequency response for the chosen size of the stave, and constructing the stave to the desired size and having the degree of porosity required in order to possess the desired resonant frequency.

Preferably, the method additionally comprises identifying an overall effective density of the stave required to further ensure the stave has the desired elastic properties and vibrational frequency response for the chosen size of the stave, and constructing the stave to the desired size and having the degree of porosity required in order to possess the desired resonant frequency.

DETAILED DESCRIPTION

The present invention provides a flextensional transducer 100 for underwater systems where the elasticity and related properties, i.e. the effective Young's Modulus for instance, of the flexing component, or stave 200, may be adapted through the inclusion of a porous structure 210 in the material of the flexing component. This allows the transducer to exhibit resonant behaviour at a lower frequency compared with an existing device such as the one shown in FIG. 1.

The Young's Modulus, sometimes referred to as the Elastic Modulus, of a bulk material is a measure of the response of that material when under a degree of stress (force applied over an area) and strain (a degree of deformation). This parameter is a significant factor in determining the resonant frequency of an object.

Density is also a contributory factor in the design of such flextensional transducer devices. While the fundamental bulk material density is unaffected by the introduction of any porous structure 210, the overall effective density of the stave 200 component is altered by the inclusion of a porous structure 210. This can also affect the resulting Young's Modulus, and consequently the resonant behaviour, of the stave 200.

Figure 1:
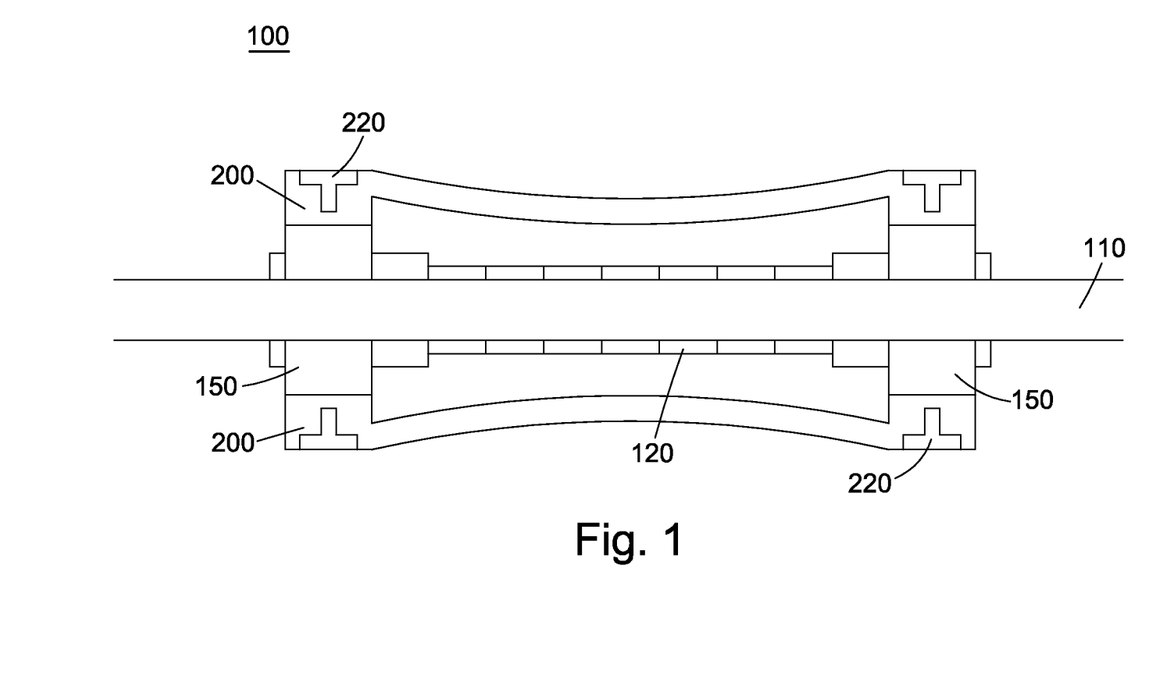
FIG. 1 A cross-section view of a conventional barrel-stave flextensional transducer.

In a conventional flextensional transducer 100, such as the one shown in FIG. 1, which has a solid i.e. non-porous stave 200, the mechanical movement of a flexing component is converted to an electrical signal, for instance by being coupled to one or more piezo-electric or magnetostrictive elements 120. This can likewise be reversed to convert electrical signals to a mechanical movement of the stave 200.

Flextensional transducers used in underwater systems usually operate by sending or receiving a series of electrical signals along an attached signal cable. A signal received from the surface via the cable can then be transmitted through the surrounding water, as in the case of an active sonar buoy. When signals are detected by the device from the surrounding water, a corresponding electrical signal can be delivered along the cable back to the surface, as in the case of a passive sonar buoy. By this principle, a string of flextensional transducers can, for example, be towed behind a ship on the surface, detecting or transmitting signals as required.

Numerous other operational configurations are also employable, such as systems which utilise a wireless signal transmission between the flextensional transducer and the surface ship.

As shown in FIG. 1, the structure of the device 100 generally comprises the flexing component, often referred to as a stave 200, constructed from a metal such as steel or a composite material, and one or more driving elements 120 which convert the electrical signal to a mechanical response, or vice versa. The driving elements 120 may operate based on a variety of different transducer principles, including, but not limited to, the piezoelectric effect or the magnetostrictive effect. FIG. 1 shows the typical components and structure of a barrel-stave type flextensional transducer 100.

It is common for the signal cable to be physically attached to a central bolt 110 of the flextensional transducer device 100, which passes through the device, such as in the device shown in FIG. 1. The one or more driving elements 120 are disposed around the central bolt 110, and can for example comprise a plurality of piezoelectric rings or disks, with electrode tabs positioned between each disk. The piezoelectric material may be a ceramic material such as PZT or a single crystal material such as PIN-PMN-PT. These disks can then react to electrical or mechanical stimulus with a respective mechanical or electrical response.

Alternatively, the driving elements 120 may comprise one or more magnetostrictive elements, or employ any other suitable alternative rather than a plurality of piezoelectric disks, such as a motor.

It is understood that the structure described thus far is a general description of underwater flextensional devices, and a skilled person would be aware of the possible variations in the shape and the components used from this general structure.

In practice, when a flextensional transducer device 100 is functioning as a transmitter, such as in an active sonar buoy, the piezoelectric disks of the driving element respond to the electrical signals delivered along the cable from the surface by generating a voltage, causing them to mechanically expand or contract. This mechanical movement is transmitted to the stave of the device 200 which is coupled to the driving element 120, which in turn responds by transmitting an acoustic signal into the surrounding water. Likewise, when the device is functioning as a receiver, such as in a passive sonar buoy, acoustic waves in the surrounding water cause the stave 200 to flex or vibrate, which in turn deforms the piezoelectric disks in the driving element 120 to which the stave 200 is coupled. The deformation of the driving element 120 then causes a voltage to be generated, resulting in an electrical signal being transmitted along the attached cable to the surface.

The detection sensitivity of the flextensional transducer device 100 when acting as a passive sonar buoy, or its transmission strength when acting as an active sonar buoy, is largely determined by the frequency response profile of the stave 200, or how the vibrational amplitude of the stave 200 changes at different frequencies. For the stave 200 to respond most effectively the frequency of the signal, either received from the attached cable or from the surrounding water, must be at or near to the resonant vibrational frequency of the stave 200. At this frequency the vibrational amplitude of the stave 200, or the degree of flexing, is greatest, and the subsequent signal generated in the attached cable or the surrounding water is most powerful. For this reason existing staves are generally constructed from a solid bulk metal, and are designed because they can be made to have the specific frequency response behaviour suitable for the intended operation.

At each driving frequency the comparatively small expansions and contractions of the driving elements 120 are amplified into a larger physical oscillation of the stave 200 as it flexes or vibrates. The degree of vibration for each frequency can be plotted to produce a plot of the frequency response curve for any particular stave 200. The vibrational displacement of the stave 200 caused by this oscillation is at a local maximum for a particular driving frequencies, and is defined by the rate of expansion and contraction of the driving element 120. These are the resonant frequencies, and are represented as peaks in the plot showing the frequency response curve for the stave. When operating at or around a resonant frequency, a flextensional transducer 100 is more sensitive in its passive mode, and can produce a more powerful signal in active mode.

The performance shown in the frequency response curve for conventional flextensional transducer devices is determined largely by the physical structure of the stave 200. The material used plays a fundamental role in determining the effective Young's Modulus, and consequently also affecting the overall effective density, of the stave 200 of the transducer along with the size and shape of the stave 200, and by extension the frequencies at which the stave 200 resonates.

While a significant amount of research has been carried out in the field with the aim of improving the performance of underwater flextensional transducer devices, the general requirement for operation at certain power levels and frequencies places limitations on physical characteristics of the devices. Often, such devices are required to operate at high power and low frequencies. For instance, high-power, low-frequency devices are useful for tracking deep oceanic water circulations, calculating the speed of sound in water, or communicating with off-shore systems.

The resonant frequencies of the flextensional transducer 100 are largely defined by the physical properties of the stave 200, specifically its size and shape, as well as the elasticity of the material it is made from. For instance, the lower resonant frequencies of the flextensional transducer 100 may be of most interest. Preferably, in order to resonate at the frequency required, a device of a particular size and shape of stave 200 must be made from a material which has a suitable Young's Modulus and also, in most aspects, a suitable overall effective density to produce the desired frequency response. Such materials can be selected using an Ashby materials selection chart that details the Young's Modulus and density of numerous material types. The Ashby materials selection chart is a well-known tool in the field of materials science.

An objective of the present invention is to allow for a greater degree of flexibility in the design, operation, and variety of applications for which flextensional devices can be used, such that, for instance, the flextensional transducer device 100 can be made smaller and lighter than conventional equivalents. For instance, a greater quantity of flextensional transducers can be transported at once, and with greater ease, if they are smaller and lighter than equivalent modern devices. The potential for reduced mass and size additionally allows for a greater adaptability of the device to different applications. It is therefore important that as greater freedom in the design of such devices is achieved, there is minimal reduction or compromise in frequency response performance.

Furthermore, in one aspect the present flextensional transducer 100 can be manufactured with fewer components. For instance, the stave 200 can be constructed as a single unit, and does not require any additional layers or connecting parts to function. This reduces the minimum complexity of device while preserving sufficient performance to maintain the desired functionality.

However, if the same material is used in the construction of staves for a pair of flextensional transducer devices, where the only difference between them is their size, there is a comparative change in the resulting resonant frequency of each. For the smaller flextensional transducer device 100, the frequency response curve (and the resonant frequency itself) is shifted to a higher frequency compared with the larger device, the performance of the device consequently being potentially impaired.

Therefore, there exists a need within the field to introduce more freedom to the design and manufacture process of such flextensional transducer devices, allowing for devices with a greater variety of characteristics, such as being smaller and lighter than current models, while preserving a high level of operational performance.

To address this need, alternative materials are therefore needed which possess the Young's Modulus and overall effective density necessary for the device to have a high level of operational performance. For instance, a device with an unconventionally small stave size requires a stave material with the appropriate Young's Modulus to ensure the performance is as high as required. However, in this case conventional bulk materials have been demonstrated to be unsuitable for smaller flextensional transducer devices, and no alternative metals, plastics, or organic materials (such as wood) have been found thus far which both possess the necessary physical properties and are practical to use.

Embodiments described herein present a solution to the existing drawbacks of flextensional transducer design, allowing for an underwater flextensional transducer 100 to be designed using common stave materials, which for example can nonetheless be smaller and lighter than existing devices, while preserving the performance and resonant behaviour required. This is achieved by introducing a porous structure 210 to the material of the stave 200, thereby altering the Young's Modulus and overall effective density of the stave material to ensure the desired resonant vibrational frequency, and the wider frequency response profile, of the stave 200 is achieved. The introduction of the porous structure 210 consequently has the advantage of increasing the design freedom of flextensional transducer devices such that it is suitable for use in a number of applications while preserving sufficient performance. As the Young's Modulus, and in some aspects, to an extent the overall effective density, are factors in the choice and degree of porous structure 210, the risk of introducing structural weaknesses to the stave 200, which the skilled person would potentially expect, is successfully mitigated.

The porous material and, in some aspects, control of the geometry or type of the lattice unit cell 205 allows the Young's Modulus and overall effective density of the stave 200 to be tuned to the required specification. This also allows materials to be employed with properties that do not fall within the normal material bounds shown on an Ashby material selection chart.

There is no requirement or necessity for this porous structure 210 to possess any directionality, for example the alignment of the elements of this porous structure 210 with respect to the driving element of the device. The porous structure 210 can therefore be described as possessing arbitrary alignment with respect to the rest of the device. In other words, there are no design limitations regarding the alignment of the structure with respect to the rest of the device. Therefore there exists a greater degree of freedom with regard to any variations in the design of the porous structure 210, compared to existing stave structures in transducers which are limited by the requirement for a specific structural geometric alignment or directionality in order to perform.

Figure 2:
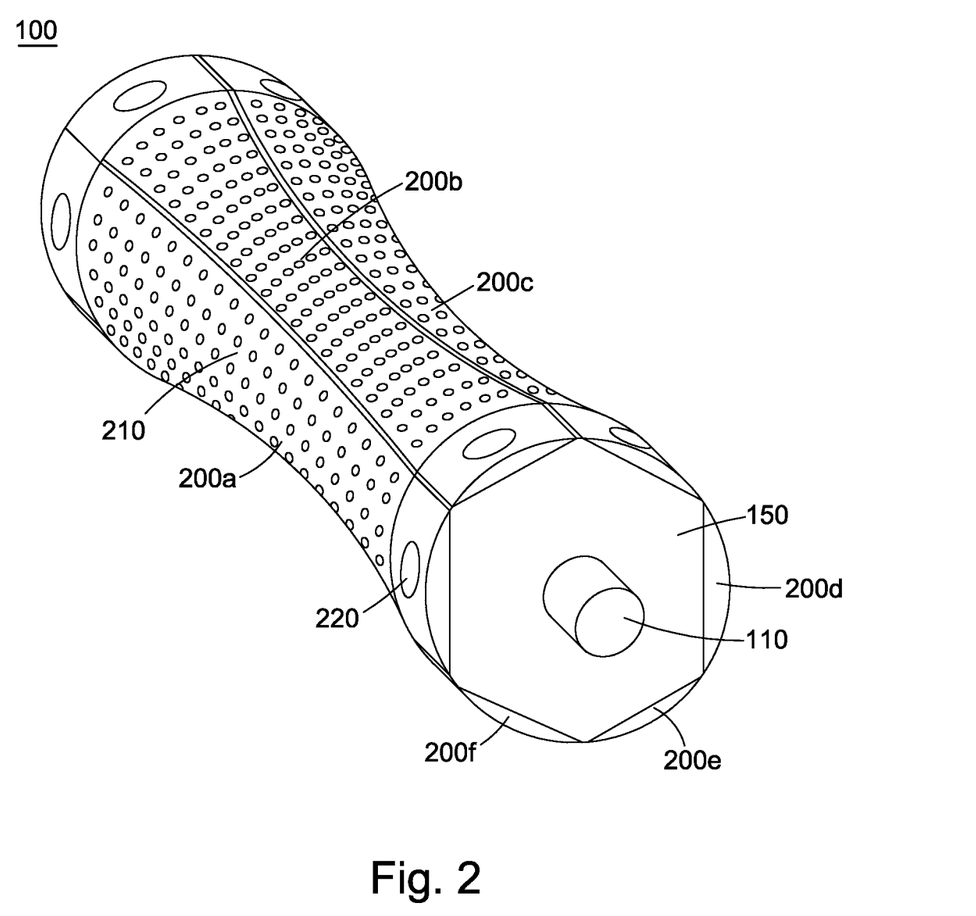
FIG. 2 A perspective view of an embodiment of a flextensional transducer according to the present invention.
Figure 3:
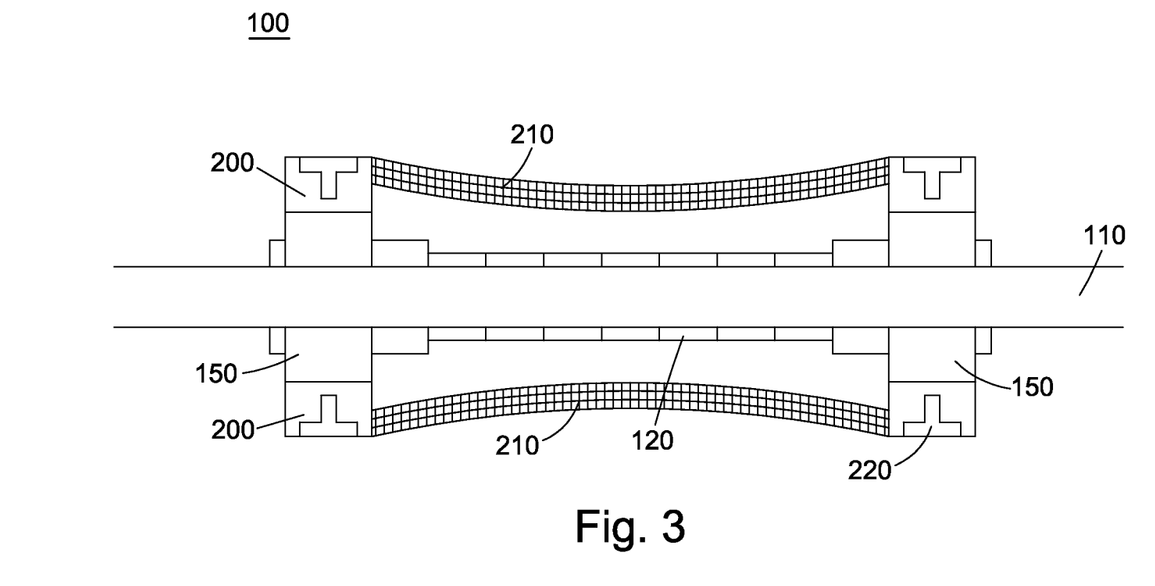
FIG. 3 A cross-section view of an embodiment of a flextensional transducer according to the present invention.

FIGS. 2 and 3 show an embodiment of the invention which is a barrel-stave transducer 100 with a porous stave structure 210. The stave 200 comprises six separate segments 200a, 200b, 200c, 200d, 200e, 200f, each of which attach to the end caps 150 at either end of the stack of transducer elements, or driving elements 120. Each segment 200a-e of the stave 200 comprises the porous structure 210. Each segment 200a-e of the stave 200 comprises fixing sections 220, for attaching the stave 200 to the end caps 150, and a central section, where the porous structure 210 is located.

The skilled person can appreciate that while the example shown in FIGS. 2 and 3 show a barrel-stave transducer 100 with a stave 200 segmented into six sections, other quantities of segment can be chosen, and likewise the stave 200 may instead be manufactured as a single part. The number of segments chosen may be necessary as a result of the manufacturing method or the specific stave shape selected.

The porous structure 210 has been seen to have an effect on the elasticity of the stave material to reduce the overall effective Young's Modulus of the stave 200 compared to the Young's Modulus of the same bulk material by reducing the volume fraction which is occupied by the stave material. This effect of the porous structure 210 on the overall Young's Modulus of the stave 200, giving rise to a variation when compared with the intrinsic Young's Modulus of that bulk material, is here referred to as the "effective" Young's Modulus.

Research into the link between the porosity of a bulk material and its effect on the overall effective Young's Modulus has demonstrated that this relationship is consistent and deterministic, and can be estimated using the equation $$E = E_0 \left( \frac{p_c - p}{p_c} \right)^f \quad \text{for } p \leq p_c$$

where E is the effective Young's Modulus in the presence of the porous structure 210, and $E_0$ is the Young's Modulus of the stave 200 in the case where there is no porous structure 210. The variable p is the degree of porosity of the stave structure, measured between zero and 1, and the variable $p_c$ is the porosity at which the effective Young's Modulus E becomes zero, usually found to be approximately equal to 1. The variable f is a parameter dependant on the grain morphology and pore geometry of the porous material. This therefore means that the f parameter is to some degree dependent upon the individual characteristics of the method of manufacturing, or the material used for fabricating the porous structure 210 of the stave 200, as well as being dependant on the lattice unit cell type 205 of the porous structure 210.

For example, in a situation where the f parameter is found to be equal to 1.2, and a volume of bulk steel is made 40% porous (p=0.4), the effective Young's Modulus of that volume of porous bulk steel is reduced from an approximate Young's Modulus of 200 GPa to 108 GPa. This also has the effect of the overall effective density of the stave 200 being reduced from 7750 kg/m³ to 4650 kg/m³.

The porosity can therefore be varied to adjust the effective Young's Modulus and overall effective density as required in order to achieve the target resonant frequency of the device 100 for a given size, shape, and material. This allows materials to be employed with properties that would not conventionally be appropriate for such devices, such as those that fall outside the normally acceptable areas shown on an Ashby material selection chart.

Using this approach, a device of a particular shape and size, intended to operate at a particular resonant frequency or display a particular resonant profile, can be designed by initially determining the Young's Modulus of the stave material required. This can be carried out using standard modelling techniques, for example finite element modelling, taking into account the type of flextensional transducer 100 and the shape of the stave 200 chosen, before then selecting a potential stave material. The stave 200 can then be designed to comprise a porous structure 210 which alters the Young's Modulus of the chosen material to a new effective Young's Modulus for the stave 200 such that the elastic response value matches that obtained from the modelling. If required, the lattice unit cell type 205 of the porous structure 210 can also be chosen to further fine-tune the resulting effective Young's Modulus of the porous structure 210 of the stave 200. The resulting porous structure 210 for the chosen stave material, as well as the shape and size of the stave 200, then ensures that the desired vibrational frequency response profile of the device 100 is achieved. The device 100 can then be assembled and any waterproofing sealing method can be applied to the outside of the stave 200 if necessary.

While the overall effective density of the stave 200 can be adjusted in addition to the Young's Modulus to achieve the required resonant behaviour, it is however not essential that this parameter is considered. The specific design of a porous structure 210 to deliver a particular overall effective density provides an extra degree of flexibility in the design of such porous structures 210.

Likewise, while the lattice unit cell type 205 of the porous structure 210 of the stave 200 can be chosen to alter the f parameter, and hence fine-tune the effective Young's Modulus in order to achieve the required resonant behaviour, it is not essential that this parameter is considered. The specific design of the lattice unit cell type 205 of a porous structure 210 provides an extra degree of flexibility in the design of such porous structures.

For example, the procedure for the design of a flextensional transducer 100 comprising a porous structure 210 could be as follows.

Firstly, a desired frequency range of operation is selected, potentially comprising one or more particular frequencies where the device is preferred to exhibit resonant behaviour. For example, a person skilled in this technical field may wish to design a flextensional transducer device 100 which operates in the frequency range from 1 kHz to 10 kHz, with a particular resonance close to 1 kHz.

Once the frequency behaviour desired has been chosen, a transducer type can be selected which is best suited for the operational purpose of the device, considering the stave shape which would be most appropriate for the given scenario. For example, the skilled person may then choose a barrel stave structure for the device.

The size and weight limitations of the device can then be assessed, considering the optimum dimensions such as device would preferably possess. For example, the skilled person may be operationally limited such that the device must be of certain dimensions, such as being no more than 12 cm in overall length.

The flextensional transducer stave 200 can then be modelled to determine the effective Young's Modulus value needed to achieve the desired resonant behaviour. A suitable material can then be selected, potentially by consulting an Ashby material selection chart and considering materials with appropriate properties. For example, the skilled person could model a barrel stave transducer which is 12 cm in length and operates between 1 kHz and 10 kHz, with a particular resonance close to 1 kHz, and conclude that the effective Young's Modulus of the stave for such a transducer must be approximately 32 GPa.

The porous structure 210 and the degree of porosity needed to achieve that effective Young's Modulus value for that chosen material can then be modelled, also considering the size and weight limitations desired for the device. The overall effective density of the stave 200 can also be considered when determining the properties of the porous structure 210 required to achieve the effective Young's Modulus value needed. Likewise, the lattice unit cell type 205 of the porous structure 210 can also be considered when determining the required porous structure 210 properties, allowing for some fine-tuning in order to achieve the effective Young's Modulus value needed. For example, given the effective Young's Modulus value required and the dimensions necessary for the stave 200, the skilled person may find that the stave 200 must have a porosity of 50%.

Finally, the stave 200 can be manufactured to the desired specification using the material chosen, comprising the porous structure 210 needed to ensure that the stave 200 possesses the appropriate effective Young's Modulus in order for the device to exhibit the required resonant behaviour. For example, having established the level of porosity required in order to manufacture a barrel stave flextensional transducer which is 12 cm in length and operates over a frequency range of 1 kHz to 10 kHz, with a particular resonance close to 1 kHz, the skilled person can then manufacture the device to those specifications.

Various embodiments will now be considered, describing the different configurations and properties available for the porous structure 210 of the stave 200. As discussed previously, the porous structure 210 of the stave 200 is not required to have any directionality with respect to the rest of the device 100, or in other words it possesses arbitrary alignment with respect to the rest of the device 100, and consequently there are no limitations on the number of different architectural approaches, both ordered and disordered, that can be implemented. This therefore delivers greater flexibility and freedom in flextensional transducer device design, and allows for a significantly more tailored approach to the design of such devices.

The porous structure 210, while possessing the advantage of an arbitrary alignment with respect to the function of the stave 200, also provides another means by which to alter the effective Young's Modulus of the stave 200. The choice of the lattice unit cell type 205 acts as an option for altering the f parameter, thereby allowing the device to be designed with even greater flexibility, and an even more specific and fine-tuned effective Young's Modulus value may be achieved. The effect of the lattice unit cell type 205 on the f parameter can be adjusted by implementing any of a range of possible periodic, ordered but non-periodic, or irregular and non-periodic porous structures.

Figure 4:
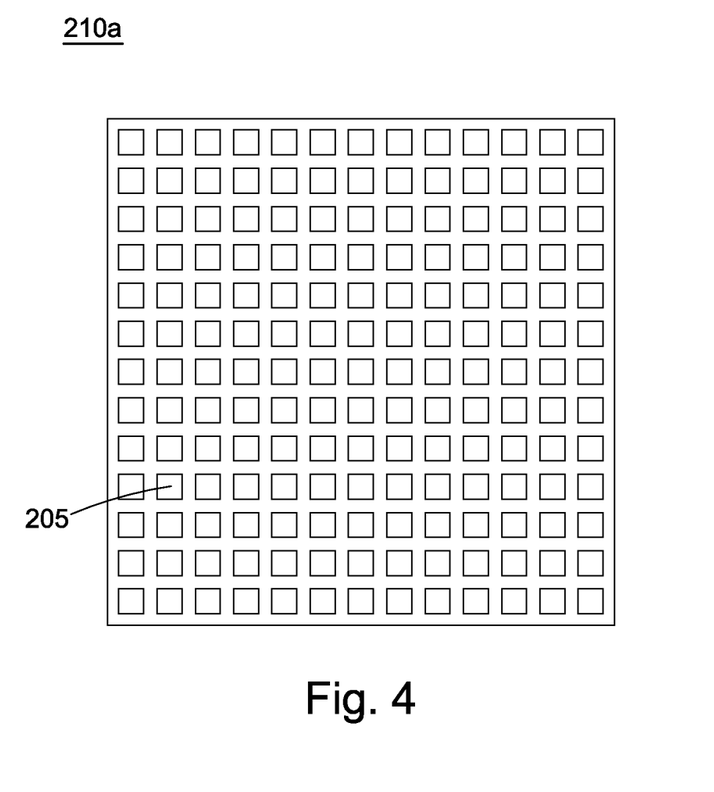
FIG. 4 A two-dimensional representation of a periodic lattice structure.

In one embodiment of the device, the porous structure 210 of the stave 200 may comprise a periodic lattice structure 210a. A period lattice 210a is arranged such that the air gaps in the structure are regularly spaced and repeated uniformly throughout the porous structure 210. FIG. 4 shows a simple two-dimensional representation of such a structure 210a, a three-dimensional equivalent of which may be used as the porous stave structure 210 of a barrel-stave transducer 100. Here, as with all embodiments of the invention, the porous structure 210 has an arbitrary alignment with respect to the rest of the device 100, and is not constrained by any requirement to be directional or aligned in any specific way with regard to the rest of the device 100. Consequently, any periodic lattice structure 210a can be chosen, and therefore the most appropriate with regard to fabrication method, repeatability of manufacture, or any other appropriate factor, can be implemented.

Figure 5:
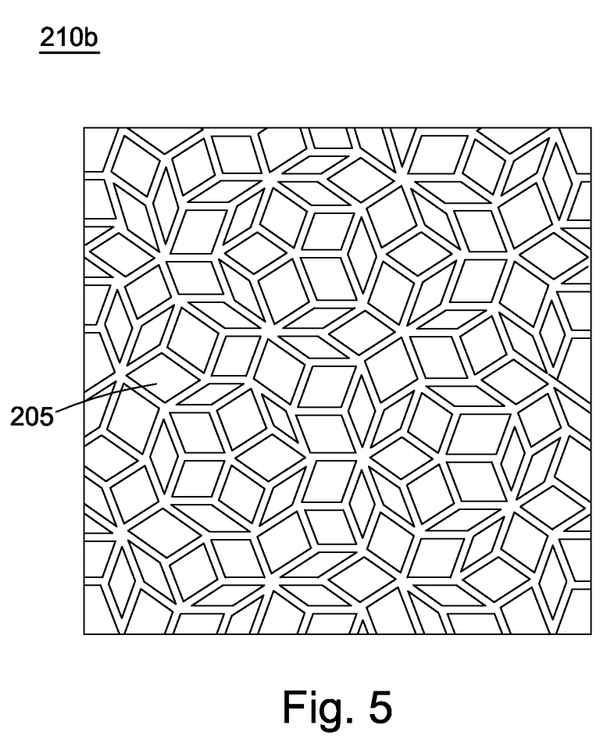
FIG. 5 A two-dimensional representation of an ordered but non-periodic lattice structure.

In a further embodiment of the device, the porous structure 210 of the stave 200 may comprise an ordered but non-periodic lattice structure 210b, such as a quasi-crystal. While quasi-crystals possess regularity in their arrangement just as periodic crystals do, they lack the consistent spatial periodicity which is typical of most crystals. FIG. 5 shows a simple two-dimensional representation of such an ordered but non-periodic structure 210b, a three-dimensional equivalent of which may be used as the porous stave structure 210 of a barrel-stave transducer 100. While the structure is not periodic, there is once again no requirement for the lattice to be directional or possess any alignment in any particular direction, and therefore has an arbitrary alignment with respect to the rest of the device 100.

Figure 6:
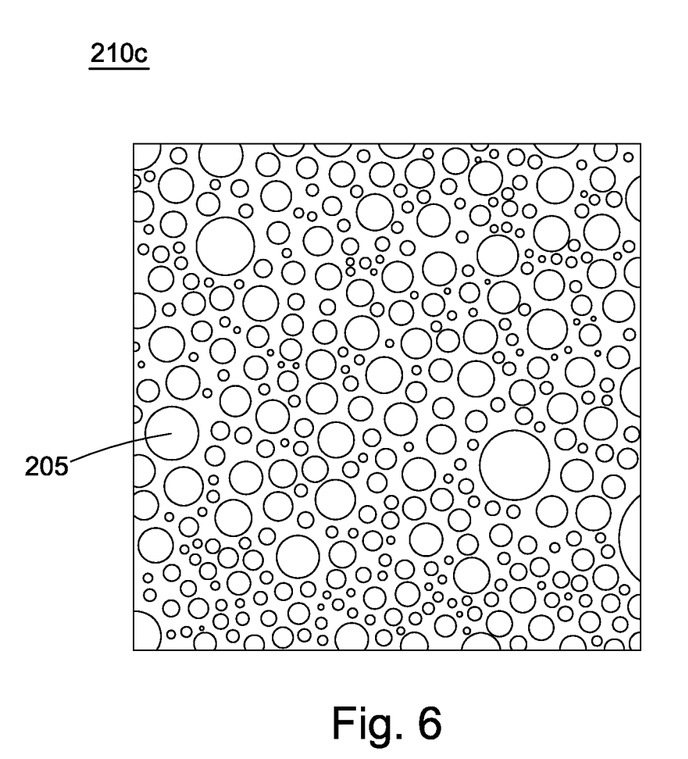
FIG. 6 A two-dimensional representation of a foam lattice structure.

In a further embodiment of the device, the porous structure 210 of the stave 200 may comprise an irregular and non-periodic foam 210c. FIG. 6 shows a simple two-dimensional representation of such a foam structure 210c, a three-dimensional equivalent of which may be used as the porous stave structure 210 of a barrel-stave transducer. The foam 210c in such a structure possesses a greater degree of disorder than structures 210a or 210b, but since the porous structure 210 has an arbitrary alignment with respect to the rest of the device 100, such a foam 210c can be employed.

The choice of porous stave structure 210 does not significantly affect the resonant performance of the final device 100, and therefore the skilled person is free to choose whichever is considered most appropriate. For instance, the method of manufacture used may possess a greater level of repeatability if the porous structure 210 is a periodic lattice 210a than if the porous structure 210 is an irregular foam 210c. Only three classes of structure are discussed here, but the skilled person can appreciate that any design of porous structure 210 can also be implemented provided that it displays the required resonant behaviour at the frequencies desired.

The design of the porous structure 210 can also vary as to whether the lattice unit cells 205 are open or closed from each other. A "cell" 205 may be defined as a single unit cell of the lattice of an ordered porous structure 210 (periodic 210a or non-periodic 210b), or an air pocket located in a porous foam structure 210c. In an open lattice unit cell structure, the air volume of some of the cells 205 are connected to at least one of their immediate neighbours, while in a closed lattice unit cell structure the air volumes of the individual lattice unit cells 205 are predominantly isolated from each other. The choice of open or closed lattice unit cells clearly also affects the unit cell geometry, and therefore can also be considered if the f parameter is used to fine-tune the effective Young's Modulus of the porous stave 200.

In a closed lattice unit cell system, this has the additional operational advantage of being automatically waterproof, whereas an open lattice unit cell system can potentially transmit water from the outer surface of the stave 200 to the inner surface, disrupting the operation of the driving element 120 inside the device 100. However, an open lattice unit cell system allows for the resonant flexing behaviour of the stave 200 to be directly observed, and this could consequently be considered to be a valuable capability to a skilled person designing such flextensional transducer devices.

It is also notable that the stave 200 can be designed to incorporate a population of both open and closed lattice unit cells 205. For instance, the surfaces of the stave 200 may incorporate closed lattice unit cells, while the interior may incorporate open lattice unit cells, forming a waterproof seal on the outer surface of the stave 200.

For underwater operation, such flextensional transducer devices often require a sealing method to ensure the waterproofing of the interior of the device 100.

Such sealing methods may comprise the use of a rubber sleeve which covers the outer surface of the stave 200. This can also serve as a suitable radiating area for the transmission of signals from the driving element 120 through the stave 200 to the surrounding water.

Another sealing method is the use of a low viscosity liquid or gel, such as Technogel, around the porous structure 210 of the stave 200, ensuring waterproofing by covering the outer surface of the stave 200. Technogel possesses a low Young's Modulus, and so once it is in contact with the outer surface of the stave 200, it does not significantly affect the overall resonant frequency of the stave 200. The skilled person can likewise appreciate that alternative appropriate sealing techniques may also be employed.

The use of these sealing methods also allows for an additional degree of fine control of the performance of the device 100, as the presence of a rubber sleeve or a sealing gel may be used to adjust the final operational frequency response curve. Furthermore, the choice of sealing material used in either case may also be used to increase the Young's Modulus of the stave 200 beyond that of the bulk stave material.

As discussed previously, an advantage of the invention is that the stave 200 of the flextensional transducer 100 can be constructed as a single piece, and does not inherently require separate connection parts or additional layers. This reduces the minimum number of components needed to implement the flextensional transducer 100, while maintaining the performance of the instrument at a sufficiently high level. Likewise, the stave 200 does not inherently require any sealing component, and can be designed to be waterproof as a result of the chosen porous structure 210 and being formed as a single piece.

However, it is notable that the skilled person may nonetheless have to include additional components for reasons aside from the underlying principle of the invention. For instance, the manufacturing method available may necessitate the construction of the stave 200 in sections rather than as a single piece. Likewise, the specific choice of open or closed cell structures may necessitate a sealing method such as the aforementioned rubber sleeve or Technogel.

The porous stave structures 210 described thus far may be manufactured in a variety of ways, including using conventional milling methods and more modern methods such as additive manufacturing.

Additive manufacturing (AM) methods may include fusion deposition or laser sintering, although the skilled person can appreciate that other AM methods can conceivably be used.

When manufacturing using AM, the porous stave 200 may be fabricated in several separate porous segments 200a, 200b, . . . , each of which can be attached to the end caps 150 to form the complete stave 200.

The skilled person may choose to design the porous structure 210 of the stave 200 such that it is capable of being free standing. This is favourable when employing AM to fabricate the stave 200.

By manufacturing the stave structures 210 using AM the staves 200 may be constructed with a high degree of accuracy and repeatability, such that the resulting resonant frequencies, and the broader frequency profiles, are consistent enough over many devices so as to be suitable for mass manufacture.

In addition to AM, for staves 200 with a three-dimensional foam structure 210c equivalent to the two-dimensional representation shown in FIG. 6, conventional foam manufacturing methods may alternatively be used, such as through gas injection into a molten metal. However, this requires the use of additional connecting parts for attaching the resulting porous foam structure 210c to the end caps 150, and is not necessary when manufacturing a foam using AM.

As would be appreciated by the skilled person, the choice of suitable materials for constructing the stave 200 depend heavily on the Young's Modulus of the bulk material, and therefore a stave 200 can conceivably be constructed using plastics or ceramics, although metals and metal alloys are most often found to meet these requirements.

Neither the materials nor the manufacturing methods described above are not intended to be limiting, and any appropriate conventional or modern technique can be utilised to form the structure required.

While the above considerations have generally concerned the design of barrel-stave transducers, persons skilled in the art will appreciate that these apply equally to any class of flextensional transducer device 100.

To demonstrate the design approach described above, a number of example porous barrel-stave devices will be presented and compared with a conventional solid barrel-stave device.

Figure 7:
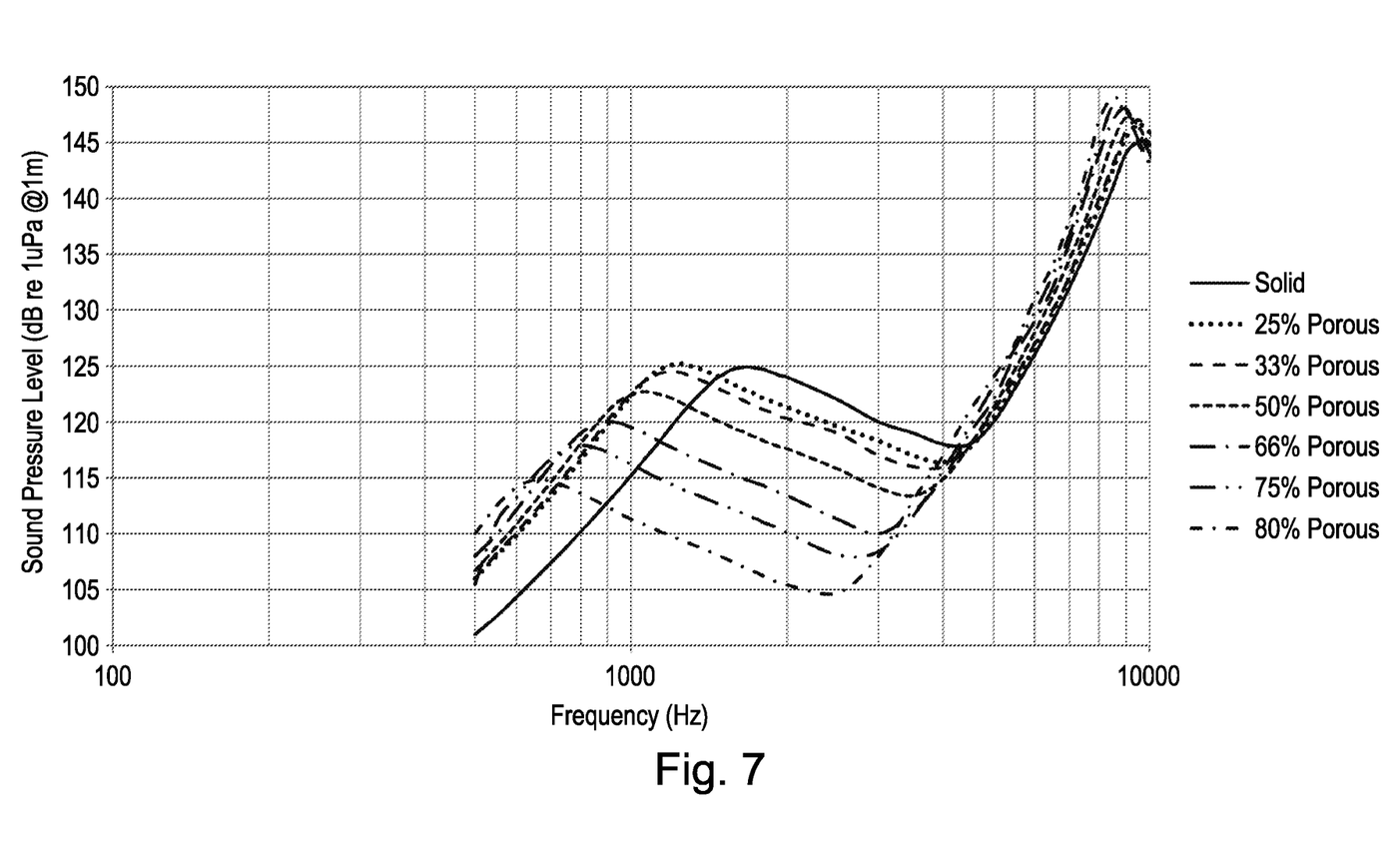
FIG. 7 Plot of frequency response curves for staves of different degrees of porosity, including a solid stave (0% porosity), 33%, 66%, and 80% porous staves.

FIG. 7 shows the modelled frequency response curves for several barrel-stave transducers, comparing the responses of smaller devices, with staves 200 that have a porous structure 210 according to the embodiments of the present invention, with a larger conventional barrel-stave transducer that has a solid metal stave 200.

The solid line of FIG. 7 represents the conventional barrel-stave transducer with a solid-metal stave 200. The stave 200 is divided into six segments 200a-e, each of which is 12.7 cm in length and 2.7 cm wide at its widest point where it is attached to the end caps of the device 100. Each segment has a maximum thickness of 5 mm and a radius of curvature of 20 cm. The stave 200 is constructed from an aluminium alloy, AlSi10 Mg, and has a Young's Modulus of approximately 68 GPa. The solid line of FIG. 7 shows two peaks in this curve, both of which being resonant frequencies located within this frequency range, for the conventional solid-stave device to be approximately 1.65 kHZ and 9.75 kHz.

The curve in FIG. 7 shown as a dotted line is for a barrel-stave device 100 with the same dimensions and materials used for the solid-stave device, where a porous structure 210 has been introduced to the stave segments. The porosity of the stave 200 for this curve is 25% and the lattice unit cell 205 chosen is a shoen-gyroid type. As a result, the curve is shown to have shifted to lower frequencies compared with the solid curve representing a stave 200 with no porous structure (the solid-metal stave 200), and the resonant frequencies are instead found at approximately 1.25 kHz and 9.5 kHz, as a result of the porous structure 210 reducing the effective Young's Modulus and overall effective density of the stave 200.

The curve of FIG. 7 shown as a wide dashed line again shows a barrel-stave device 100 with the same dimensions and materials used for the solid-stave device, only now employing a stave 200 with a porous structure 210 with a porosity of 33% and a shoen-gyroid type lattice unit cell 205. The curve is observed to shift slightly further to lower frequencies compared with the solid-metal stave device, with the resonant frequencies now found at approximately 1.2 kHz and 9.45 kHz, as a result of the more porous structure 210 further reducing the effective Young's Modulus and overall effective density.

The curve of FIG. 7 shown as a narrow dashed line again shows a barrel-stave device 100 with the same dimensions and materials used for the solid-stave device, only now employing a stave 200 with a porous structure 210 with a porosity of 50% and a shoen-gyroid type lattice unit cell 205. The frequency response curve is observed to have shifted further again to lower frequencies compared with the curves representing the solid-stave and those staves of lower porosities, and the resonant frequencies are now found at approximately 1.05 kHz and 9.1 kHz as a result of the reduction in the effective Young's Modulus and overall effective density caused by the higher degree of porosity in the porous structure 210.

The curve of FIG. 7 shown as a wide dot-dashed line again shows a barrel-stave device 100 with the same dimensions and materials used for the solid-stave device, only now employing a stave 200 with a porous structure 210 with a porosity of 66% and a shoen-gyroid type lattice unit cell 205. The frequency response curve is observed to have shifted to shorter frequencies again, and the resonant frequencies are shown to now be found at 0.9 kHz and 8.9 kHz, again as a result of the increased degree of porosity in the porous structure 210 reducing the effective Young's Modulus and overall effective density.

The curve of FIG. 7 shown as a wide double dot-dashed line again shows a barrel-stave device 100 with the same dimensions and materials, only now employing a stave 200 including a porous structure 210 with a porosity of 75% and a shoen-gyroid type lattice unit cell 205. The frequency response curve is shown to continue to shift to shorter frequencies as the degree of porosity is increased, and the resonant frequencies are now located around approximately 0.75 kHz and 8.65 kHz as the effective Young's Modulus and overall effective density are further reduced.

Finally, the curve of FIG. 7 shown as a narrow dot-dashed line shows a barrel-stave device 100 with the same dimensions and materials, only now employing a stave 200 including a porous structure 210 with a porosity of 80% and a shoen-gyroid type lattice unit cell 205. The frequency response curve is observed to have shifted further again, with the resonant frequencies now found at approximately 0.65 kHz and 8.5 kHz, again as a result of the increasing degree of porosity of the porous structure 210 reducing the effective Young's Modulus and overall effective density.

It is therefore clear from FIG. 7 that as the porous structure 210 of the stave 200 reduces the effective Young's Modulus, the resonant frequencies of the stave 200 are likewise reduced. Consequently, the increase in the Young's Modulus, and the resulting resonant frequencies, when the size of a flextensional transducer device 100 is reduced can be compensated for by including a sufficient degree of porosity in the porous structure 210 of the stave 200.

Figure 8:
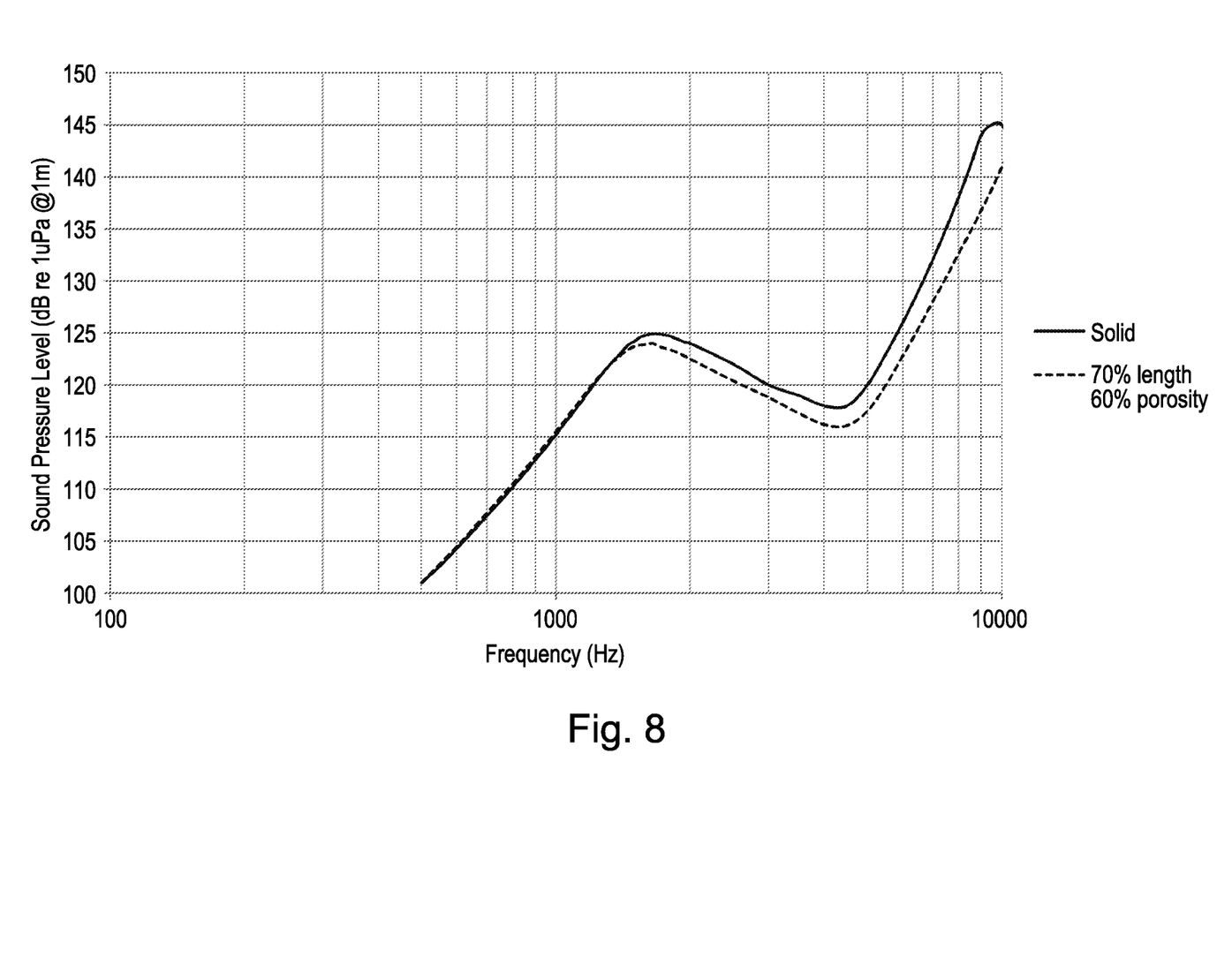
FIG. 8 Plot of frequency response curves comparing a solid-stave (0% porosity) with a stave which is 60% porous and with a length which is 70% of that of the solid-stave.

FIG. 8 shows a direct example of this principle. The solid line represents the frequency response curve for the same barrel-stave transducer with a solid-metal stave as shown earlier as the solid line in FIG. 7. Therefore, the dimensions of this solid-metal stave 200 are the same as those of the device discussed in FIG. 7. The resonant frequency of this solid-stave transducer at the lower end of the frequency range is observed to be approximately 1.65 kHz.

By comparison, a barrel-stave transducer device 100 of the same type, only smaller in size and employing a porous stave structure 210, is shown as the dashed line in FIG. 8. In this device, the stave 200 is again divided into six segments 200a-e, and the components used in the flextensional transducer 100 are the same as for the solid-stave device.

The length of the flextensional transducer device 100 represented by the dashed line of FIG. 8 has been reduced to 70% of the length of the solid stave 200 represented as the solid line, and has a porous structure 210 with a porosity of 60%. The other physical dimensions of this flextensional transducer 100 with a porous stave 200 have been reduced by an equivalent amount. The lattice unit cell type 205 for the porous structure 210 of the porous stave 200 was chosen to be a periodic schoen-gyroid structure.

The device with a porous stave structure 210 is observed in FIG. 8 to also have a resonant frequency of approximately 1.65 kHZ, showing that the increased porosity of the stave 200 has compensated for the reduced physical size of the stave 200 in this frequency region, and the resonant behaviour is consequently very similar for both devices. This is despite the significant size reduction of the device comprising a stave 200 with a porous structure 210. It is therefore clear how the selection and manufacture of an appropriate porous structure 210 in the staves 200 of such flextensional transducers allows for greater flexibility of the physical properties of the device while the operational performance compared with conventional devices.

Figure 9:
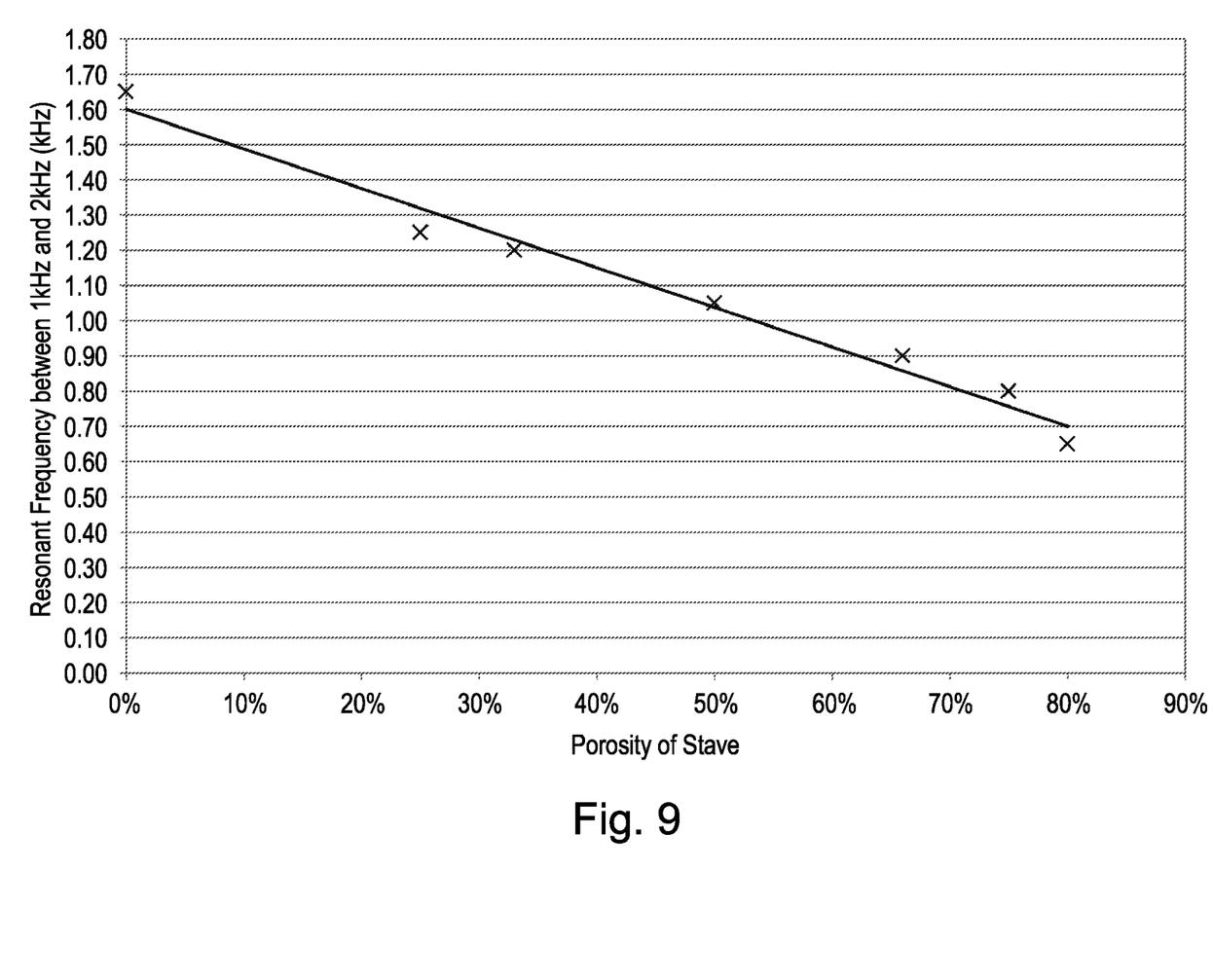
FIG. 9 Plot of the changes in the resonant frequency of staves where only the degree of porosity is varied. Includes porosities of 0% (a solid-stave), 25% 33%, 50%, 66%, 75%, and 80%.

FIG. 9 shows the reduction in the resonant frequency of a stave 200 as the degree of porosity of the porous structure 210 is incrementally increased. The stave dimensions and properties are identical to those used for the data shown earlier in FIG. 7 and for the solid stave 200 shown in FIG. 8. The plot shows the change in the resonant frequency found in the frequency range between 0.5 kHz and 2 kHz as the porosity of the stave 200 is increased from 0% (a solid-stave) to 25%, 33%, 50%, 66%, 75%, and 80%. The resulting plot shows this resonant frequency shifting to lower frequencies as the degree of porosity is increased, demonstrating how the degree of porosity of the porous structure 210 of the stave 200 affects the resonant behaviour of the device.

While embodiments herein have been described with reference to a barrel-stave flextensional transducer 100, persons skilled in the art will appreciate that the systems and methods disclosed are not limited to this particular implementation.

While certain embodiments have been described, these embodiments have been presented by way of example only, and are not intended to limit the scope of the invention. Indeed, persons skilled in the art will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A flextensional transducer for underwater operation, comprising a driving element and a stave, wherein the stave;
   is made from a material with elastic properties; and
   has a porous structure, wherein the porous structure of the stave comprises an ordered but non-periodic lattice.

2. The flextensional transducer of claim 1, wherein the porous structure defines the overall effective density of the stave.

3. The flextensional transducer of claim 1, wherein the stave is a single part.

4. The flextensional transducer of claim 1, wherein the stave is comprised of a plurality of segments.

5. The flextensional transducer of claim 1, wherein the driving element comprises at least one piezoelectric element or magnetostrictive element.

6. The flextensional transducer of claim 1, wherein the stave is manufactured by additive manufacturing.

7. The flextensional transducer of claim 1, wherein the stave is manufactured from a metal, metal alloy, or a plastic.

8. The flextensional transducer of claim 1, wherein the stave is a barrel-stave flextensional transducer type.

9. The flextensional transducer of claim 1, wherein the flextensional transducer is sealed inside a rubber sleeve.

10. The flextensional transducer of claim 1, wherein the flextensional transducer is sealed using a sealant that surrounds the stave.

11. A method for manufacturing a stave for a flextensional transducer for underwater operation, where the flextensional transducer comprises a driving element and a stave, where
    the stave is made from a material with elastic properties;
    has a porous structure; and
    is of an arbitrary alignment with respect to the driving element,
    the method comprising;
    identifying a desired resonant frequency;
    identifying a desired size of the stave;
    identifying a degree of porosity for the porous structure required to ensure the stave has the desired elastic properties and vibrational frequency response for the chosen size of the stave, and constructing the stave to the desired size and having the degree of porosity required in order to possess the desired resonant frequency.

12. The method of claim 11, wherein the method additionally comprises: identifying a lattice unit cell type required to further ensure the stave has the desired elastic properties and vibrational frequency response for the chosen size of the stave, and constructing the stave to the desired size and having the degree of porosity required in order to possess the desired resonant frequency.

13. The method of claim 11, wherein the method additionally comprises: identifying an overall effective density of the stave required to further ensure the stave has the desired elastic properties and vibrational frequency response for the chosen size of the stave, and constructing the stave to the desired size and having the degree of porosity required in order to possess the desired resonant frequency.

* * * * *